US011194484B2

(12) United States Patent
Ripberger

(10) Patent No.: US 11,194,484 B2
(45) Date of Patent: *Dec. 7, 2021

(54) ENABLEMENT OF LICENSED FEATURES AT A LOGICAL VOLUME LEVEL OF GRANULARITY

(71) Applicant: INTERNATIONAL BUSINESS MACHINES CORPORATION, Armonk, NY (US)

(72) Inventor: Richard A. Ripberger, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 653 days.

This patent is subject to a terminal disclaimer.

(21) Appl. No.: 15/487,996

(22) Filed: Apr. 14, 2017

(65) Prior Publication Data

US 2017/0220279 A1 Aug. 3, 2017

Related U.S. Application Data

(63) Continuation of application No. 12/725,252, filed on Mar. 16, 2010, now Pat. No. 9,659,264.

(51) Int. Cl.
*G06Q 20/38* (2012.01)
*G06F 3/06* (2006.01)
(Continued)

(52) U.S. Cl.
CPC .......... *G06F 3/0622* (2013.01); *G06F 3/0637* (2013.01); *G06F 3/0665* (2013.01);
(Continued)

(58) Field of Classification Search
CPC ...................................................... G06Q 10/06
(Continued)

(56) References Cited

U.S. PATENT DOCUMENTS 5,892,900 A * 4/1999 Ginter .................... G06Q 20/12
726/26
6,301,605 B1 * 10/2001 Napolitano ........... G06F 3/0611
709/201

(Continued)

OTHER PUBLICATIONS

Office Action dated Aug. 3, 2010, pp. 12, for U.S. Appl. No. 12/725,252, filed Mar. 16, 2010.

(Continued)

*Primary Examiner* — Chinedu C Agwumezie
(74) *Attorney, Agent, or Firm* — Konrad Raynes Davda & Victor LLP; Rabindranath Dutta

(57) ABSTRACT

A licensing application implemented in a computational device receives a request to enable a feature for a logical volume of a plurality of logical volumes controlled by the computational device, wherein each feature of a plurality of features is configurable to be enabled or disabled for one or more logical volumes of the plurality of logical volumes. The licensing application determines, whether enabling the feature for the logical volume causes a licensed capacity limit for the feature to be exceeded. Enabling the feature for the logical volume is avoided, in response to determining that enabling the feature for the logical volume causes the licensed capacity limit for the feature to be exceeded.

15 Claims, 9 Drawing Sheets

(51) Int. Cl.
*G06Q 50/18* (2012.01)
*G06Q 10/06* (2012.01)

(52) U.S. Cl.
CPC .......... *G06F 3/0689* (2013.01); *G06Q 10/06* (2013.01); *G06Q 50/184* (2013.01)

(58) Field of Classification Search
USPC .......................................................... 705/59
See application file for complete search history.

(56) References Cited

U.S. PATENT DOCUMENTS

| | | | | |
|---|---|---|---|---|
| 6,662,284 | B2 * | 12/2003 | Gold | G06F 21/78 707/999.009 |
| 6,715,070 | B1 * | 3/2004 | Peloquin | G06F 3/0605 707/999.2 |
| 6,950,943 | B1 * | 9/2005 | Bacha | H04L 63/126 726/21 |
| 2006/0122945 | A1 | 6/2006 | Ripberger et al. | |
| 2008/0092138 | A1 | 4/2008 | Chung et al. | |
| 2010/0122028 | A1 * | 5/2010 | Fujibayashi | G06F 3/0637 711/114 |
| 2011/0231323 | A1 | 9/2011 | Ripberger | |

OTHER PUBLICATIONS

Response dated Nov. 3, 2010, pp. 16, to Office Action dated Aug. 3, 2010, pp. 12, for U.S. Appl. No. 12/725,252, filed Mar. 16, 2010.
Final Office Action dated Feb. 8, 2011, pp. 14, for U.S. Appl. No. 12/725,252, filed Mar. 16, 2010.
Response dated May 9, 2011, pp. 16, to Final Office Action dated Feb. 8, 2011, pp. 14, for U.S. Appl. No. 12/725,252, filed Mar. 16, 2010.
Office Action dated Sep. 25, 2012, pp. 15, for U.S. Appl. No. 12/725,252, filed Mar. 16, 2010.
Response dated Dec. 26, 2012, pp. 21, to Office Action dated Sep. 25, 2012, pp. 15, for U.S. Appl. No. 12/725,252, filed Mar. 16, 2010.
Final Office Action dated Apr. 17, 2013, pp. 19, for U.S. Appl. No. 12/725,252, filed Mar. 16, 2010.
Notice of Appeal and Pre-Appeal Brief Request filed Jul. 17, 2013, pp. 6, for U.S. Appl. No. 12/725,252, filed Mar. 16, 2010.
Notice of Allowance dated Jan. 17, 2017, pp. 17, for U.S. Appl. No. 12/725,252, filed Mar. 16, 2010.

* cited by examiner

ENABLEMENT OF LICENSED FEATURES AT A LOGICAL VOLUME LEVEL OF GRANULARITY

CROSS-REFERENCE TO RELATED APPLICATION

This application is a continuation of U.S. patent application Ser. No. 12/725,252, filed Mar. 16, 2010, which application is incorporated herein by reference in its entirety.

BACKGROUND

1. Field

The disclosure relates to a method, a system, and a computer program product for the enablement of licensed features at a logical volume level of granularity.

2. Background

A hardware or software product may include a plurality of features, wherein a feature may correspond to a function that is capable of being performed by the product. The product may be configurable in a manner such that selected features may be enabled or disabled in the product via a licensing mechanism. In such situations, the selected features that are enabled may be referred to as licensed features. For example, certain software vendors may provide a free version of a software in which only a restricted set of features are enabled, and on receipt of a licensing fee may enable additional features that are not available for use in the free version.

Certain mechanisms may provide a licensing key to a customer who ordered a feature for a product. The licensing key may be an encoded value that may be decoded by a program and verified, and based on verification of the licensing key the ordered feature may be enabled in the product. In certain situations, licensing mechanisms may be used in environments in which a plurality of storage devices are controlled by a storage controller.

SUMMARY OF THE PREFERRED EMBODIMENTS

Provided are a method, a system, and a computer program product, in which a licensing application implemented in a computational device receives a request to enable a feature for a logical volume of a plurality of logical volumes controlled by the computational device, wherein each feature of a plurality of features is configurable to be enabled or disabled for one or more logical volumes of the plurality of logical volumes. The licensing application determines, whether enabling the feature for the logical volume causes a licensed capacity limit for the feature to be exceeded. Enabling the feature for the logical volume is avoided, in response to determining that enabling the feature for the logical volume causes the licensed capacity limit for the feature to be exceeded.

In further embodiments, the feature is enabled for the logical volume, in response to determining that enabling the feature for the logical volume does not cause the licensed capacity limit for the feature to be exceeded.

In yet further embodiments, the computational device is a storage controller, wherein the plurality of logical volumes are generated from physical volumes of a plurality of storage devices coupled to the storage controller. In response to an enablement or disablement of one or more selected features for one or more logical volumes of a group of sequentially numbered logical volumes, a single interrupt is sent from the storage controller to each host of a plurality of hosts that are coupled to the storage controller, wherein the single interrupt is indicative of changes in the one or more selected features for all logical volumes of the group of sequentially numbered logical volumes.

In additional embodiments, selected logical volumes of the plurality of logical volumes are grouped into a resource group. In response to a request for enablement of a selected feature for the resource group, a determination is made as to whether enabling the selected feature for all the selected logical volumes of the resource group causes a licensed capacity limit for the selected feature to be exceeded. Enabling the selected feature for the resource group is avoided, in response to determining that enabling the selected feature for all the selected logical volumes of the resource group causes the licensed capacity limit for the selected feature to be exceeded, wherein enabling the selected feature for the resource group causes the selected feature to be enabled for all the selected logical volumes of the resource group.

In yet additional embodiments, the selected feature is enabled for the resource group, in response to determining that enabling the selected feature for all the selected logical volumes of the resource group does not cause the licensed capacity limit for the selected feature to be exceeded.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The enablement or disablement of features may be performed with respect to storage products. For example, a product may be configured such that a function may be enabled or disabled for an exemplary Count-Key-Data (CKD) storage. The level of granularity for enablement of features in such cases is at the CKD storage level. CKD is a disk data organization model in which the disk is assumed to consist of a fixed number of tracks, each having a maximum data capacity.

In certain environments, the above level of granularity at the CKD storage level may be inadequate. Certain users may prefer to use a selected function on specific logical volumes, as opposed to all CKD volumes. It may be noted that each CKD volume may be logically mapped into a plurality of logical volumes.

Certain embodiments provides a mechanism to enable a feature at the granularity of a logical volume while at the same time ensuring that the total amount of storage that may be used for the enabled feature does not exceed a licensed storage capacity corresponding to the feature.

In certain embodiments, the mechanism for determining whether a licensed storage capacity limit is violated (i.e., exceeded) is implemented by determining the sum of the storage capacities of all storage volumes that are currently enabled, adding to this sum the storage capacities of any storage volumes that are requested to be enabled, and comparing this sum to a licensed storage capacity limit in a licensing key such that the licensed storage capacity limit is not violated if the sum of the storage volume capacities of the currently enabled and the to be enabled storage volumes is less than or equal to the licensed storage capacity limit.

Exemplary Embodiments

Figure 1:
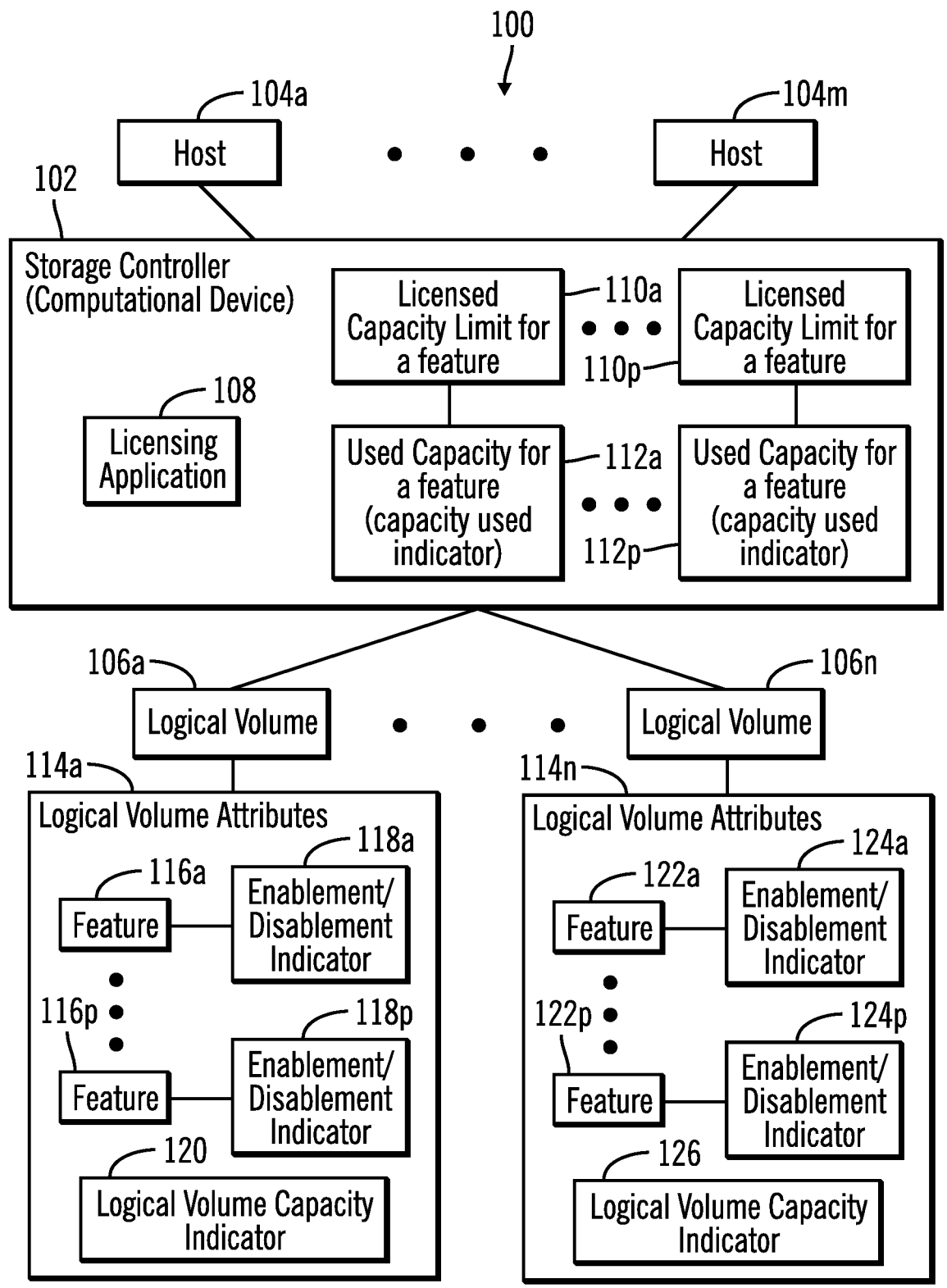
FIG. 1 illustrates a block diagram of a computing environment that includes a storage controller coupled to a plurality of hosts and a plurality of logical volumes, in accordance with certain embodiments.

FIG. 1 illustrates a block diagram of a computing environment 100 that includes a storage controller 102 coupled to a plurality of hosts 104a . . . 104m and a plurality of logical volumes 106a . . . 106n, in accordance with certain embodiments. In certain embodiments, the storage controller 102 and the hosts 104a . . . 104m may comprise any suitable computational device, including those presently known in the art, such as, a personal computer, a workstation, a server, a mainframe, a hand held computer, a palm top computer, a telephony device, a network appliance, a blade computer, a storage server, etc. The logical volumes 106a . . . 106n may comprise logical representations corresponding to one or more physical volumes maintained in storage devices coupled to the storage controller 102.

A licensing application 108 may execute within the storage controller 102. The licensing application 108 maintains data structures to indicate the licensed capacity limits 110a . . . 110p and the corresponding used capacity limits 112a . . . 112p for a plurality of features.

The licensing application 108 also controls logical volume attributes 114a . . . 114n associated with the logical volumes 106a . . . 106n. Each logical volume attribute associated with a logical volume has for each of a plurality of features an indicator that indicates enablement or disablement of the feature, and an indicator that indicates the storage capacity of the logical volume. For example, logical volume attribute 114a for logical volume 106a has enablement/disablement indicators 118a . . . 118p corresponding to features 116a . . . 116p, and the logical volume capacity indicator 120. Similarly, logical volume attribute 114n for logical volume 106n has enablement/disablement indicators 124a . . . 124p corresponding to features 122a . . . 122p, and the logical volume capacity indicator 126.

In certain embodiments, the licensing application 108 may enable a feature for a logical volume by setting the enablement/disablement indicator corresponding to the feature to an enabled state. For example, the licensing application 108 may enable the feature 116a for the logical volume 106a by setting the enablement/disablement indicator 118a to an enabled state. While enabling a feature for the logical volume, the licensing application 108 ensures that the licensed capacity limit of the feature is not exceeded, wherein exemplary capacity limits of features are shown via reference numerals 110a . . . 110p.

Figure 2:
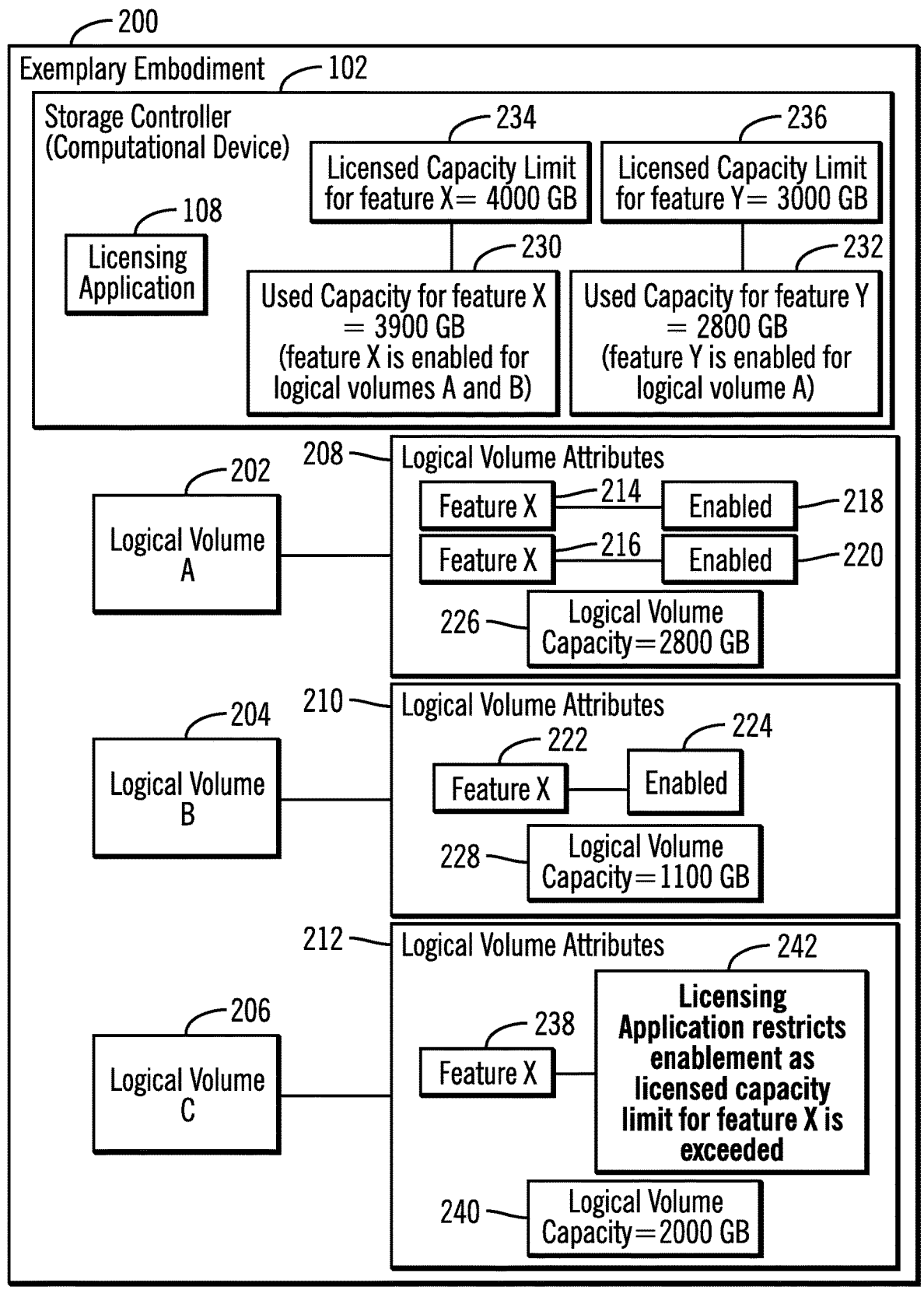
FIG. 2 illustrates a block diagram of an exemplary embodiment in which a licensing application restricts enablement of a feature for a logical volume when the licensed capacity limit has been reached, in accordance with certain embodiments.

FIG. 2 illustrates a block diagram of an exemplary embodiment 200 in which the licensing application 108 restricts enablement of a feature for a logical volume when the licensed capacity limit for the feature has been reached, in accordance with certain embodiments.

In the exemplary embodiment 200, three logical volumes A, B, C (indicated via reference numerals 202, 204, 206) and the corresponding logical volume attributes 208, 210, 212 are shown. Feature X and Feature Y have been enabled (as shown via reference numerals 214, 216, 218, 220) for logical volume A 202, whereas feature X has been enabled (as shown via reference numerals 222, 224) for logical volume B 204, wherein the logical volume capacity 226 of logical volume A 202 is 2800 GB, and wherein the logical volume capacity 228 of logical volume B 204 is 1100 GB.

Feature X is enabled for logical volume A 202 and logical volume B 204, wherein the capacity of logical volume A is 2800 GB and the capacity of logical volume B is 1100 GB. Therefore, the used capacity for feature X (shown via reference numeral 230) is the sum of 2800 GB and 1100 GB which is 3900 GB. Feature Y is enabled for logical volume A 202, wherein the capacity 226 of logical volume A is 2800 GB. Therefore, the used capacity for feature Y (shown via reference numeral 232) is 2800 GB.

FIG. 2 also indicates that the licensed capacity limit of feature X 234 is 4000 GB and the licensed capacity limit of feature Y 236 is 3000 GB. In such a situation, if an enablement of feature X 238 is desired for logical volume C 206 that has a logical volume capacity 240 of 2000 GB, then the licensing application 108 restricts (shown via reference numeral 242) the enablement of feature X for logical volume C because enabling feature X for logical volume C 206 would cause the used capacity for feature X to be the sum of the already used 3900 GB (shown via reference numeral 230) and the 2000 GB capacity (shown via reference numeral 240) of logical volume C 206, and this sum of 5900 GB would exceed the 4000 GB licensed capacity limit of feature X (shown via reference numeral 234).

Therefore, FIG. 2 illustrates certain embodiments in which a feature is not enabled for a logical volume, if enabling the feature for the logical volume would cause the licensed capacity limit of the feature to be exceeded.

Figure 3:
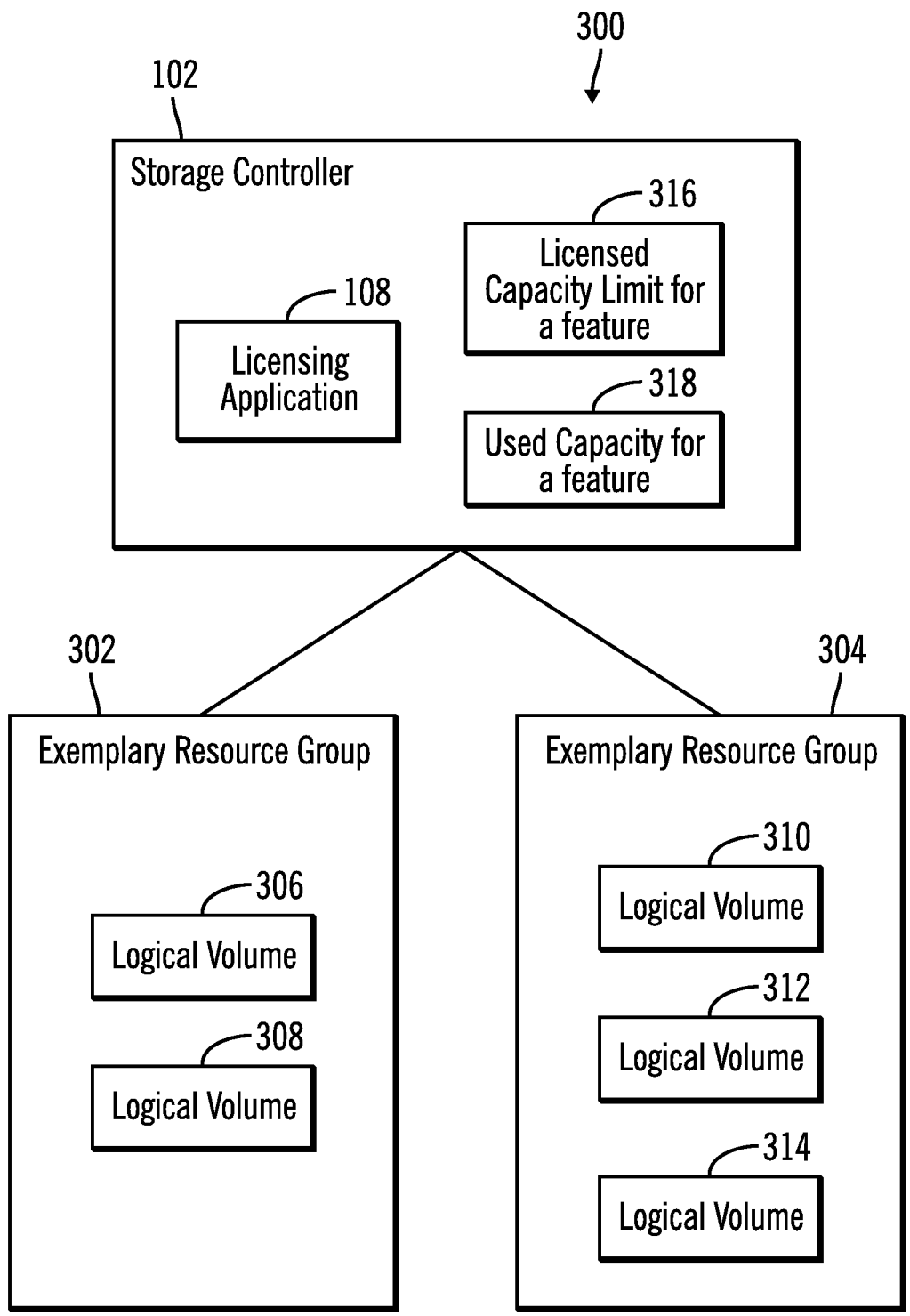
FIG. 3 illustrates a block diagram that shows exemplary resource groups generated from logical volumes, in accordance with certain embodiments.

FIG. 3 illustrates a block diagram 300 that shows exemplary resource groups 302, 304 generated from a plurality of logical volumes 306, 308, 310, 312, 314, in accordance with certain embodiments. Each exemplary resource group has one or more logical volumes.

In FIG. 3, an exemplary licensed capacity limit 316 for a feature and the used capacity 318 for the feature are also shown. When the licensing application 108 enables a feature for an exemplary resource group, then the feature is enabled for all logical volumes that belong to the resource group. For example, enabling a feature for exemplary resource group 304 enables the feature for logical volumes 310, 312, 314, and the used capacity 318 of the feature increases by the sum of capacities of the logical volumes 310, 312, and 314. In certain embodiments, the mechanism to associate an exemplary logical volume with a resource group is to add a "resource group" attribute to each exemplary logical volume such that all logical volumes which specify "resource group"=N are associated with resource group N.

Figure 4:
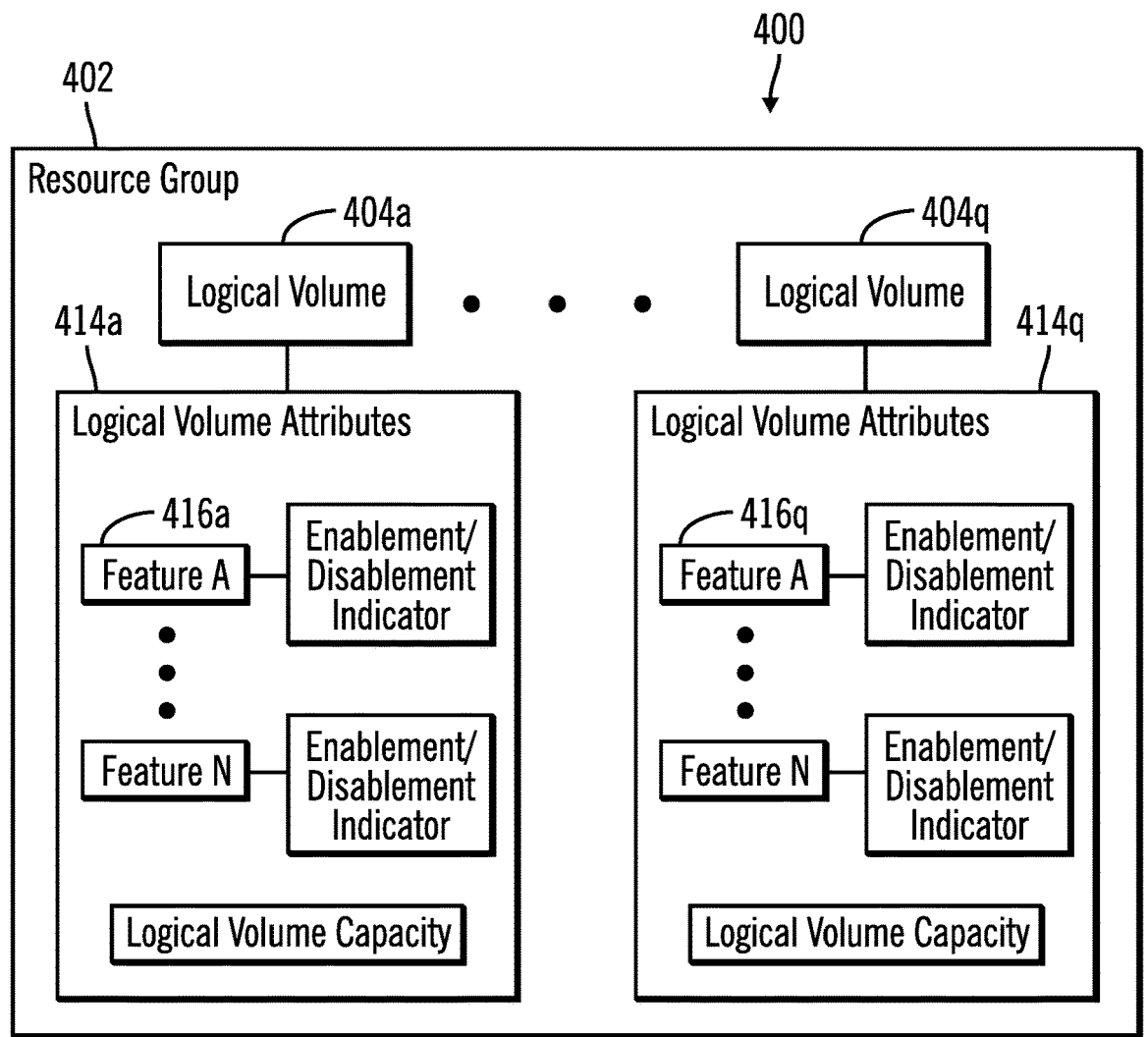
FIG. 4 illustrates a block diagram that shows how enabling a feature in a resource group enables the feature in all logical volumes of the resource group, in accordance with certain embodiments.
Figure 4:
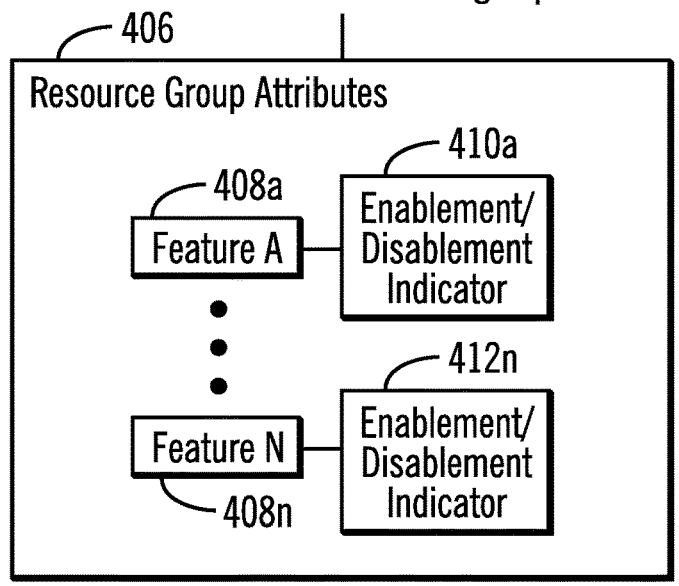

FIG. 4 illustrates a block diagram 400 that shows how enabling a feature in a resource group 402 enables the corresponding feature in logical volumes 404a . . . 404q of the resource group 402, in accordance with certain embodiments.

In FIG. 4, the licensing application 108 (shown in FIG. 1) maintains resource group attributes 406 corresponding to the resource group 402. Corresponding to a plurality of features 408a . . . 408n, enablement/disablement indicators 410a . . . 410n are maintained in the resource group attributes 406. The licensing application 108 also maintains for the logical volumes 404a . . . 404q of the resource group 402 corresponding logical volume attributes 414a . . . 414q.

In certain exemplary embodiments, if a customer or a user enables an exemplary feature A 408a in the resource group attributes 406, then the licensing application 108 enables feature A 416a . . . 416q for all the logical volumes 404a . . . 404q.

It should be noted that in FIG. 4, although enablement/disablements indicators have been shown associated with features in the logical volume attributes 114a . . . 114q, in the embodiments illustrated in FIG. 4 the enablement attributes for features are provided by the attributes 406 of the resource group 402 and not by the attributes 414a . . . 414q of the logical volumes 404a . . . 404q. In the embodiment illustrated by FIG. 4, the individual enablement/disablement indication on each logical volume for a given feature would only be modified through the setting of the resource group's 402 associated enablement/disablement indicators 410a . . . 410n for a given feature.

The embodiments shown in FIG. 4 prevent the logical volume attributes from being modified independently. The logical volume's 404a . . . 404q enablement/disablement indicators for a given feature must all have the same value which is equal to the resource group's 402 value for a selected feature's 408a . . . 408n enablement/disablement indicator 410a . . . 412n.

In certain alternative embodiments, when logical volumes are placed in resource groups, individual enablement/disablement indicators are not longer maintained in logical volume attributes of logical volumes.

Figure 5:
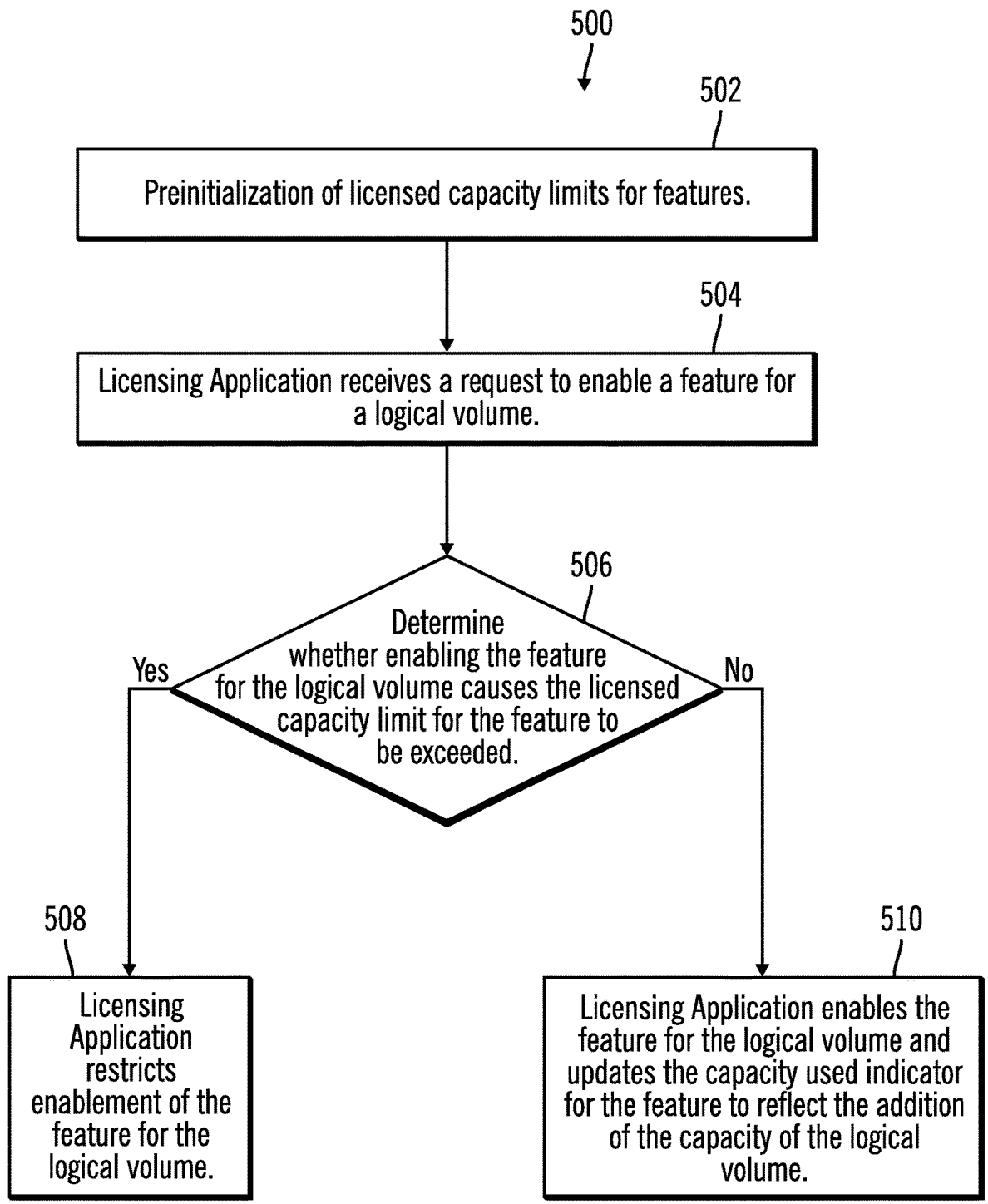
FIG. 5 illustrates a first flowchart that shows how a licensing application enables or restricts enablement of a feature for a logical volume, in accordance with certain embodiments.

FIG. 5 illustrates a first flowchart 500 that shows how the licensing application 108 enables or restricts enablement of a feature for a logical volume, in accordance with certain embodiments. The operations shown in the first flowchart 500 may be performed by executing the licensing application 108 within the storage controller 102.

Controls starts at block 502 in which a preinitialization of licensed capacity limits 110a . . . 110p for features are performed. The preinitialization of features may be based on licensing terms purchased by a customer from a vendor of a software or a hardware product that has a plurality of features, wherein selected features from the plurality of features may be enabled based on the licensing terms, and wherein the licensing terms also include capacity limits for each feature. The preinitialization may be performed by the licensing application 108 based on interactions with the customer or a user via a graphical user interface or via a command line interface.

Control proceeds to block 504, and the licensing application 108 receives a request to enable a feature for a logical volume. The licensing application 108 determines (at block 506) whether enabling the feature for the logical volume causes the licensed capacity limit 110a . . . 110p for the feature to be exceeded. If so, the licensing application 108 restricts (at block 508) enablement of the feature for the logical volume.

If enabling the feature for the logical volume causes the licensed capacity limit 110a . . . 110p for the feature not to be exceeded, then the licensing application 108 enables (at block 510) the feature for the logical volume and updates the capacity used indicator 112a . . . 112p for the feature to reflect the addition of the capacity of the logical volume.

Therefore, FIG. 5 illustrates certain embodiments in which the licensing application 108 enables or restricts enablement of a feature for a logical volume based on the licensed capacity limit for the feature.

Figure 6:
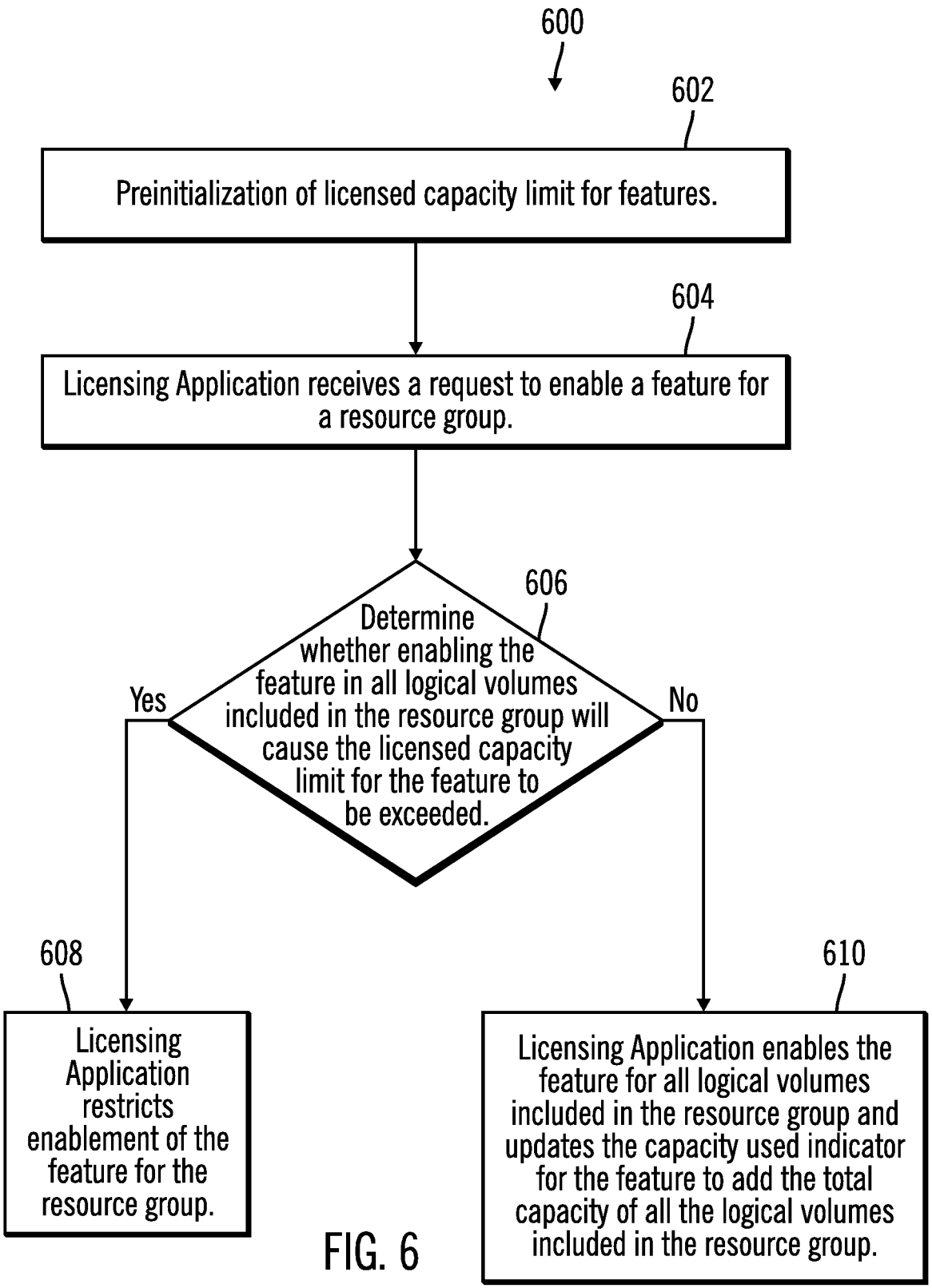
FIG. 6 illustrates a second flowchart that shows how a licensing application enables or restricts enablement of a feature for a resource group, in accordance with certain embodiments.

FIG. 6 illustrates a second flowchart 600 that shows how a licensing application 108 enables or restricts enablement of a feature for a resource group (such as, exemplary resource group 402), in accordance with certain embodiments. The operations shown in the second flowchart 600 may be performed by executing the licensing application 108 within the storage controller 102.

Control starts as block 602, in which a preinitialization of licensed capacity limit 110a . . . 110p for features takes place. The licensing application 108 receives (at block 604) a request to enable a feature for a resource group 402.

The licensing application 108 determines (at block 606) whether enabling the feature in all logical volumes included in the resource group will cause the licensed capacity limit for the feature to be exceeded. If so, the licensing application 108 restricts (at block 608) enablement of the feature for the resource group 402.

If the licensing application 108 determines that enabling the feature in all logical volumes included in the resource group 402 will not cause the licensed capacity limit for the feature to be exceeded, then the licensing application 108 enables (at block 610) the feature for all logical volumes included in the resource group and updates the capacity used indicator 112a . . . 112p for the feature to add the total capacity of all the logical volumes included in the resource group 402.

Therefore, FIG. 6 illustrates certain embodiments in which the licensing application 108 enables or restricts enablement of a feature for a resource group having a plurality of logical volumes based on the licensed capacity limit for the feature.

Figure 7:
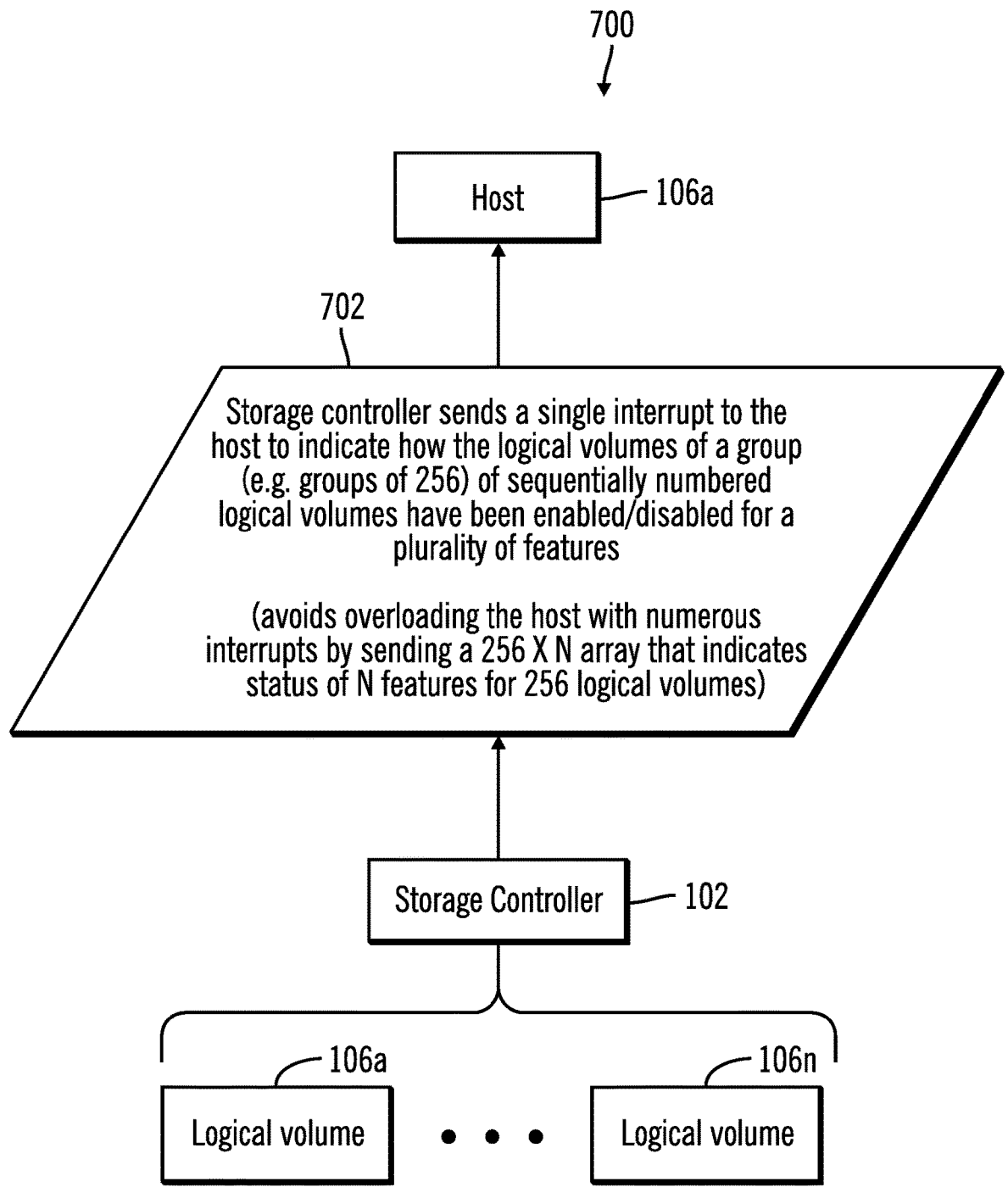
FIG. 7 illustrates a block diagram that shows how the storage controller sends an interrupt to a host, in accordance with certain embodiments.

FIG. 7 illustrates a block diagram 700 that shows how the storage controller 102 sends an interrupt to an exemplary host 106a, in accordance with certain embodiments. The operations shown in the block diagram 700 may be performed by executing the licensing application 108 within the storage controller 102.

When the status of a logical volume 106a . . . 106n changes, i.e., a feature is enabled or disabled for a logical volume, the change in status of the logical volume should be conveyed by the storage controller 102 to the hosts 104a . . . 104m, such that the feature can be used or not used by the host with respect to the logical volume. Since there may be numerous changes to the status of numerous logical volumes (e.g., there may be 64 K logical volumes in certain embodiments), if an interrupt is sent for every status change in each logical volume, then the hosts 104a . . . 104m may be overburdened by receiving numerous interrupts and significant processing power of the hosts may be used in servicing the numerous interrupts.

In certain embodiments, the storage controller 102 sends (shown via reference numeral 702) a single interrupt to each exemplary host (such as, exemplary host 104a) to indicate the changed status of logical volumes of a group of sequentially numbered logical volumes that have been enabled/disabled for one or more features. The single interrupt conveys the status of a group of logical volumes. For example, if there are N enablement/disablement indicators for each logical volume, and 256 sequentially numbered logical volumes are grouped for the purposes of sending interrupts, then a (256×N) array may convey the status of all the N features for each of the 256 logical volumes via a single interrupt.

Therefore, FIG. 7 illustrates certain embodiments in which a single notification is presented via a single interrupt for all the logical volumes with a range of 256 addresses to reduce the number of notifications required. The notification via the single interrupt indicates the enablement/disablement status of all features of a group of logical volumes to an exemplary host. FIG. 7 illustrates exemplary embodiments, in which in response to an enablement or disablement of one or more selected features for one or more logical volumes of a group of sequentially numbered logical volumes, a single interrupt is sent from the storage controller 101 to each host of a plurality of hosts that are coupled to the storage controller 102, wherein the single interrupt is indicative of changes in the one or more selected features for all logical volumes of the group of sequentially numbered logical volumes.

Figure 8:
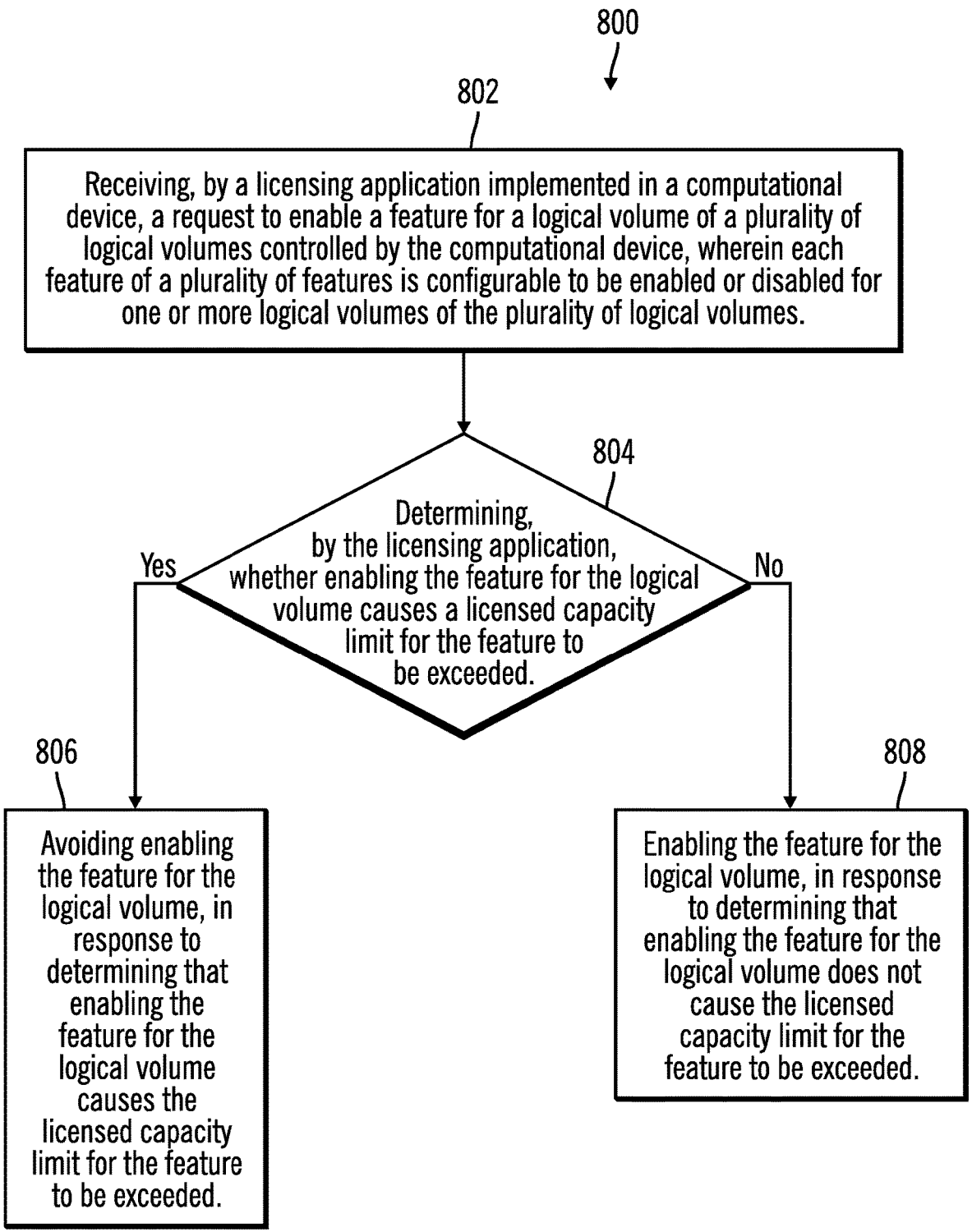
FIG. 8 illustrates a third flowchart, in accordance with certain embodiments.

FIG. 8 illustrates a third flowchart 800, in accordance with certain embodiments. The operations shown in the third flowchart 800 may be performed by executing the licensing application 108 within the storage controller 102.

Control starts at block 802, in which a licensing application 108 implemented in a computational device 102 (e.g., the storage controller 102) receives a request to enable a feature for a logical volume of a plurality of logical volumes 106a . . . 106n controlled by the computational device 102, wherein each feature of a plurality of features is configurable to be enabled or disabled for one or more logical volumes of the plurality of logical volumes.

The licensing application 108 determines (at block 804) whether enabling the feature for the logical volume causes a licensed capacity limit (e.g., 110a) for the feature to be exceeded, If so (i.e., the "Yes" branch from block 804), the licensing application 108 avoids (at block 806) enabling the feature for the logical volume, In response to determining (at block 804) that enabling the feature for the logical volume causes the licensed capacity limit for the feature not to be exceeded (i.e., the "No" branch from block 804), the licensing application 108 enables (at block 808) the feature for the logical volume.

Therefore, FIG. 8 illustrates certain embodiments in which a licensing application enables or disables features at the granularity of logical volumes based on the licensed capacity corresponding to the feature. It should be noted that certain embodiments shown in FIG. 8 are applicable to the situation in which there are no resource groups. However, in certain embodiments a mechanism is provided to allow the enablement/disablement control to be specified for a group of volumes via the usage of a resource group, and as a result the need to control the enablement/disablement on each volume as a separate request is avoided.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
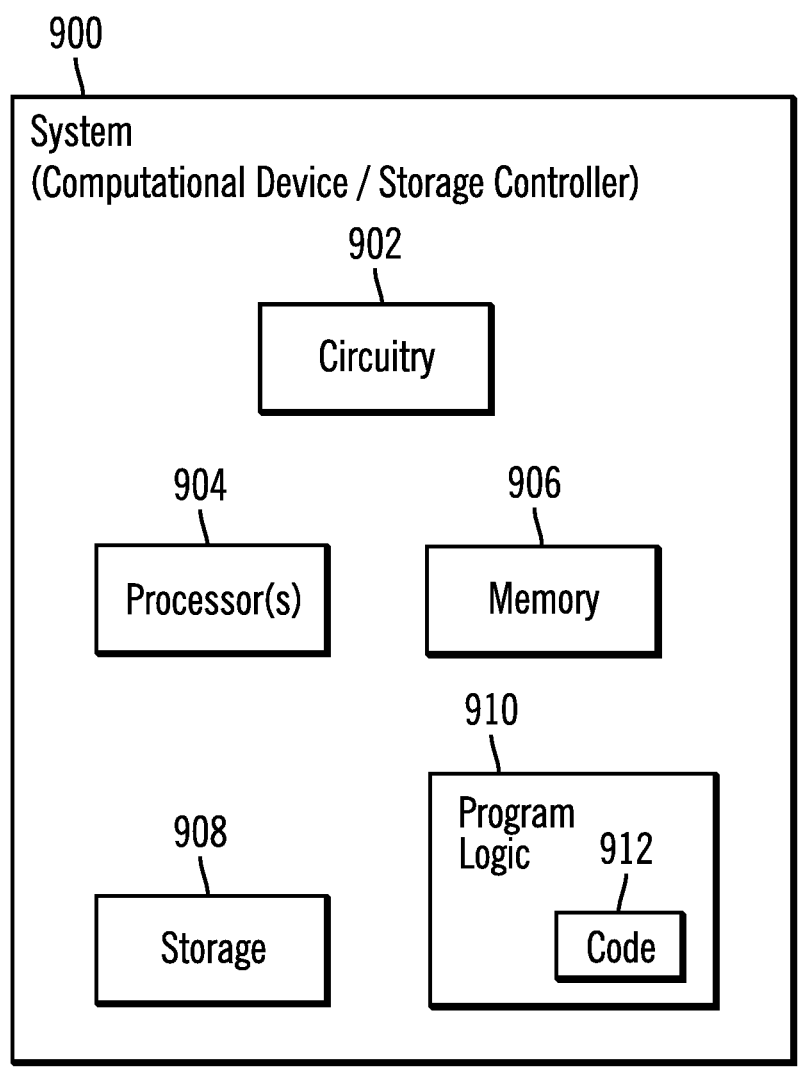
FIG. 9 illustrates a block diagram of a computational system that shows certain elements that may be included in the storage controller of FIG. 1, in accordance with certain embodiments.

FIG. 9 illustrates a block diagram that shows certain elements that may be included in the system 900 in accordance with certain embodiments. The system 900 may comprise the storage controller 102 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
receiving, in a computational device, a request to enable a feature for a logical volume of a plurality of logical volumes, wherein each feature of a plurality of features is configurable to be enabled or disabled for one or more logical volumes of the plurality of logical volumes; and
subsequent to an enablement or disablement of one or more selected features for one or more logical volumes of a group of sequentially numbered logical volumes, sending a single interrupt from the computational device to each host of a plurality of hosts that are coupled to the computational device, wherein the single interrupt is indicative of changes in the one or more selected features for all logical volumes of the group of sequentially numbered logical volumes.

2. The method of claim 1, the method further comprising:
determining whether enabling the feature for the logical volume causes a licensed capacity limit for the feature to be exceeded.

3. The method of claim 2, the method further comprising:
avoiding enabling the feature for the logical volume, in response to determining that enabling the feature for the logical volume causes the licensed capacity limit for the feature to be exceeded.

4. The method of claim 1, wherein the computational device is a storage controller, wherein the plurality of logical volumes are generated from physical volumes of a plurality of storage devices coupled to the storage controller.

5. The method of claim 4, wherein selected logical volumes of the plurality of logical volumes are grouped into a resource group, the method further comprising:
in response to a request for enablement of a selected feature for the resource group, determining whether enabling the selected feature for all the selected logical volumes of the resource group causes a licensed capacity limit for the selected feature to be exceeded.

6. A system, comprising:
a memory; and
a processor coupled to the memory, wherein the processor performs operations, the operations comprising:
receiving a request to enable a feature for a logical volume of a plurality of logical volumes, wherein each feature of a plurality of features is configurable to be enabled or disabled for one or more logical volumes of the plurality of logical volumes; and
subsequent to an enablement or disablement of one or more selected features for one or more logical volumes of a group of sequentially numbered logical volumes, sending a single interrupt from the system to each host of a plurality of hosts that are coupled to the system, wherein the single interrupt is indicative of changes in the one or more selected features for all logical volumes of the group of sequentially numbered logical volumes.

7. The system of claim 6, the operations further comprising:
determining whether enabling the feature for the logical volume causes a licensed capacity limit for the feature to be exceeded.

8. The system of claim 7, the operations further comprising:
avoiding enabling the feature for the logical volume, in response to determining that enabling the feature for the logical volume causes the licensed capacity limit for the feature to be exceeded.

9. The system of claim 6, wherein the system is a storage controller, wherein the plurality of logical volumes are generated from physical volumes of a plurality of storage devices coupled to the storage controller.

10. The system of claim 9, wherein selected logical volumes of the plurality of logical volumes are grouped into a resource group, the operations further comprising:
in response to a request for enablement of a selected feature for the resource group, determining whether enabling the selected feature for all the selected logical volumes of the resource group causes a licensed capacity limit for the selected feature to be exceeded.

11. A computer program product, the computer program product comprising:
a non-transitory computer readable storage medium having stored thereon:
first program instructions executable by a computational device to cause the computational device to receive, a request to enable a feature for a logical volume of a plurality of logical volumes, wherein each feature of a plurality of features is configurable to be enabled or disabled for one or more logical volumes of the plurality of logical volumes; and
second program instructions executable by the computational device to cause the computational device to subsequent to an enablement or disablement of one or more selected features for one or more logical volumes of a group of sequentially numbered logical volumes, send a single interrupt from the computational device to each host of a plurality of hosts that are coupled to the computational device, wherein the single interrupt is indicative of changes in the one or more selected features for all logical volumes of the group of sequentially numbered logical volumes.

12. The computer program product of claim 11,
wherein the non-transitory computer readable storage medium has stored thereon third program instructions executable by the computational device to cause the computational device to determine whether enabling the feature for the logical volume causes a licensed capacity limit for the feature to be exceeded.

13. The computer program product of claim 12,
wherein the non-transitory computer readable storage medium has stored thereon fourth program instructions executable by the computational device to cause the computational device to avoid enabling the feature for the logical volume, in response to determining that enabling the feature for the logical volume causes the licensed capacity limit for the feature to be exceeded.

14. The computer program product of claim 11, wherein the computational device is a storage controller, wherein the plurality of logical volumes are generated from physical volumes of a plurality of storage devices coupled to the storage controller.

15. The computer program product of claim 14,
wherein the non-transitory computer readable storage medium has stored thereon third program instructions executable by the computational device to cause the computational device to in response to a request for enablement of a selected feature for the resource group, determine whether enabling the selected feature for all the selected logical volumes of the resource group causes a licensed capacity limit for the selected feature to be exceeded.

* * * * *